Oct. 28, 1924.
D. J. BRENNAN ET AL
1,512,904
HACK SAW BLADE HOLDER
Filed March 14, 1923
Fig. 1.
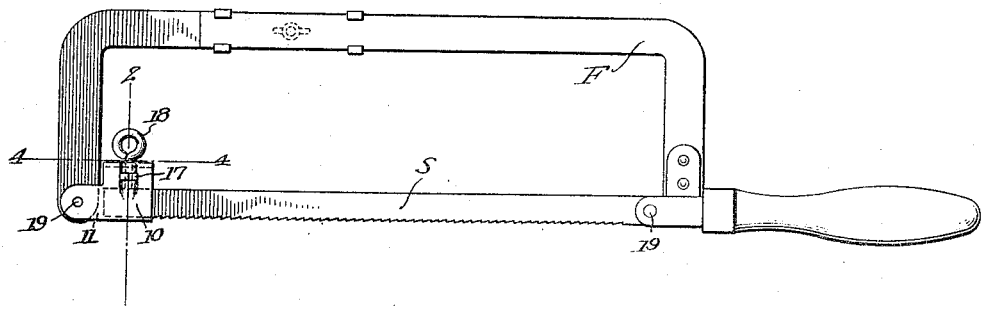
Fig. 3.
Fig. 2.
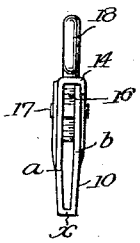
Fig. 4.
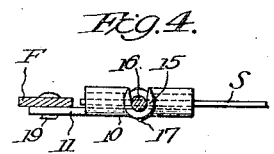
Fig. 7.
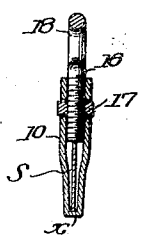
Fig. 5.
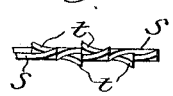
Fig. 6.
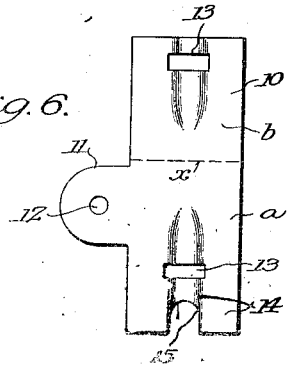
Inventors
Dennis J. Brennan
James J. Gilroy
By *Edw. R. Watson*
Attorney Patented Oct. 28, 1924.

1,512,904

UNITED STATES PATENT OFFICE.

DENNIS J. BRENNAN, OF GERMANTOWN, AND JAMES J. GILROY, OF LOST CREEK, PENNSYLVANIA.

HACK-SAW-BLADE HOLDER.

Application filed March 14, 1923. Serial No. 624,996.

*To all whom it may concern:*

Be it known that we, DENNIS J. BRENNAN and JAMES J. GILROY, citizens of the United States, residing at Germantown, Philadelphia, and at Lost Creek, in the county of Schuylkill, both in the State of Pennsylvania, respectively, have invented a new and useful Hack-Saw-Blade Holder, of which the following is a specification.

The present invention is a holder and splice for hacksaw blades.

The object of the present invention is the production of such a holder, which can be manufactured in large quantities by a stamping process at an extremely low cost, there being no milling or turning operations required and at the same time producing a very efficient and durable device.

The features of the invention reside in the construction and arrangement of parts, and further in the fact that the device can be used as a coupling or splice to connect broken sections of saw blades when it is necessary, the device being so constructed that when the spliced sections are secured together, the teeth of the sections will interlock, thus insuring a secure connection or splice.

In this specification and the annexed drawings, the invention is disclosed in the form in which it is considered to be the best, but the invention is not limited to such form because it is capable of being embodied in other forms; and it is to be understood that in and by the claims following the description herein it is intended to cover the invention in whatever form it may embody within the scope of the claims.

In the drawings which show the preferred embodiment of the invention as at present devised, Figure 1 is a side elevation of a hacksaw, showing one end of the blade broken and held on the saw frame by the invention.

Fig. 2 is a vertical sectional view taken substantially on line 2—2 of Fig. 1.

Fig. 3 is an end view of the holder.

Fig. 4 is a horizontal sectional view, taken on line 4—4, Fig. 1.

Fig. 5 shows a fragmentary view of a hacksaw frame and illustrating the invention as splicing two broken ends or sections of the straw blade, and Fig. 6 is a plan view of the blank from which the body of the holder is made.

Fig. 7 is a plan view of overlapping ends of broken portions of a saw blade.

Referring particularly to the drawings, in which like characters denote similar and like parts throughout the several views, 10 denotes the body of the holder constructed from an elongated strip of metal, shown in Fig. 6, having a laterally projecting ear 11 on one of its side edges and to one side of a line substantially drawn through the transverse center of the strip. The ear 11 is provided with a suitable perforation or recess 12 for a purpose later referred to. The strip 10 has perforations 13, one in each end portion thereof and at substantial distances apart on opposite sides of the line $x$, which is where the strip is bent upon itself. The opposite end portions of the strip 10 form the side walls of the holder in the finished article, and one end portion of the strip on one side of the line $x$ is slightly longer than the other end portion, producing the portion 14, which is folded over the top of the holder, as shown particularly in Figs. 3 and 4. This end portion 14 is cut away at 15 to provide an opening through which the binding screw 16 extends.

When the blank shown in Fig. 6 is formed into the finished article, the openings 13 are in alinement, these openings being of such shape and size as to receive a small internally threaded nut or other body member 17, into which the threaded shank of the screw 16 engages. The upper end of the screw 16 is provided with a suitable thumbpiece 18 to facilitate the operation of the binding screw 16. From Figs. 2, 3 and 4, it will be observed that the side wall portions $a$ and $b$ of the holder have their inner faces depressed outwardly at portions adjacent the openings 13, so as to accommodate for the thickness of the adjusting screw 16. When the blank shown in Fig. 6 is folded on line $x$, the attaching ear 11 lies in the vertical plane with the body member and with one wall only (namely wall $a$). The opening 12 is to engage with the usual attaching stud 19, or other similar fastening means provided on the saw frame for the purpose of securing the saw blade thereto.

In the use of the present invention, it is to be understood that whenever a saw blade S breaks, the broken end of the blade can be inserted between the walls $a$ and $b$ of the holder 10 and be rigidly clamped therein by screwing down the adjusting screw 16 thereupon, and by engaging the usual stud 19 of the saw frame in the opening 12 of the attaching ear 11, the broken portion of the saw can be used without necessitating entire replacement thereof.

Another very important feature of the present invention is, that the present holder can be used to splice two broken sections of a saw blade together as shown in Fig. 5, this use being particularly advantageous when the broken portions of the saw are relatively short and by splicing the broken portions, the blade can be made longer for use in the saw frame. In the present device, by reason of the inner surfaces of the side walls $a$ and $b$ converging slightly toward the bottom $x$ of the holder, the adjacent portions of the saw blade sections which overlap in the holder, as shown in Fig. 5, will be forced firmly together and in contact with the side walls $a$ and $b$ when the screw 16 is moved into clamping relation therewith. The particular action of this is, that the teeth $t$ on the overlapping portions of the saw blade will become interlocked, by reason of the teeth being set, thus preventing any longitudinal movement of the overlapping sections and resulting in the sections of the saw blade being firmly coupled or spliced together.

It will be noticed in the present invention that the side walls $a$ and $b$ extend throughout the length and breadth of the holder, thereby giving at all times sufficient lateral support to the saw blade and preventing the same from buckling or twisting out of the holder. The side wall $b$ is firmly maintained in its position by the end portion 14 of the wall $a$ being bent over its upper ends as fully illustrated in Fig. 3 and overlapping therewith.

Having thus described our said invention and in what manner the same is to be used, we declare that which is new and upon which we desire to secure by Letters Patent, is:

1. A saw blade holder of the kind described, comprising a body member having two spaced side walls closed at its bottom, the inner faces of said walls converging toward said bottom from a width sufficient to receive two blades side by side to a width substantially equal to the width of one blade so that when two are inserted and thrust along the converging walls their cutting edges will be brought in close contact, and a binding screw adjustably supported in the upper end of the holder and extending between said walls to bind saw blade or blades between said walls and bottom of the body member.

2. A saw blade holder of the kind described comprising a body member formed from a strip of metal bent upon itself to form two opposing spaced walls having openings in the upper portions thereof, said openings being in alinement with each other, the upper end of one of said walls being extended laterally therefrom and lying over the upper end of said opposite wall and overlapping the upper edge thereof to prevent the walls from spreading, an internally threaded member disposed in said alined openings of said wall and a binding screw extending through said laterally extended end of one of said walls and in threaded engagement with said threaded member, said walls being outwardly offset and said laterally extended end being notched to accommodate said binding member between the walls and to permit it to extend through said end, and means on the holder for attaching the same to a saw frame.

3. A saw blade holder of the kind described, comprising a body formed from a strip of metal bent upon itself to form two opposing spaced walls converging from a width sufficient to receive two blades side by side to a width substantially equal to the width of one blade so that when two blades are inserted and thrust along the converging walls their cutting edges will be brought in close contact, the upper end of one of said walls being extended laterally therefrom and overlying and overlapping the upper end of said opposite wall, a binding screw adjustably mounted in the upper end of said holder and extending between said wall, and means on the holder for attaching the same to a saw frame.

In testimony whereof we have hereunto set our hands.

DENNIS J. BRENNAN.
JAMES J. GILROY.

Witnesses:
FRANCIS RAYMOND,
ANNA J. BENNIS.